United States Patent [19]

Belanger et al.

[11] Patent Number: 5,755,339
[45] Date of Patent: May 26, 1998

[54] RETAINING DEVICE FOR TRANSPORTING STACKS OF ON-EDGE SUPPORTED SHEETS OF FLOAT GLASS

[76] Inventors: Rosaire Belanger, 543, Gingras, Ste-Foy, Québec, Canada, G1X 3X8; Gaston Germain, 305, Avenue Dery, St-Raymond, Québec, Canada, G0A 4G0; Claude Roussin, 1040, Chemin du Golf, Ville-Marie, Québec, Canada, J0Z 2W0; Albert Bergeron, 1, Route Ontario, Notre-Dame-du-Nord, Québec, Canada, J0Z 3B0; Benoît Lepage, 4266, Curé Drolet, Cap-Rouge, Quebéc, Canada, G1Y 3K1

[21] Appl. No.: 729,842

[22] Filed: Oct. 15, 1996

(Under 37 CFR 1.47)

[51] Int. Cl.[6] .................................................. A47F 7/00
[52] U.S. Cl. ....................................................... 211/41.14
[58] Field of Search .................... 211/41.14; 206/454, 206/451; 224/401, 405

[56] References Cited

U.S. PATENT DOCUMENTS 2,156,876  10/1939  Scull .
2,305,405  8/1942  Burrell .
2,839,198  6/1958  Lefeure ........................ 211/41.14
2,919,811  1/1960  Schodorf, Sr. ................. 211/41.14
3,719,284  3/1973  Rasmusson et al. ............ 211/41.14 X
3,878,942  4/1975  Hansen et al. .
3,955,676  5/1976  Hansen et al. .
3,964,908  6/1976  Bargon et al. .
4,014,435  3/1977  Rowley et al. .
4,278,171  7/1981  Millhoan ....................... 211/41.14 X
4,927,032  5/1990  Mercure ........................ 211/41.14

*Primary Examiner*—Alvin C. Chin-Shue
*Assistant Examiner*—Sarah L. Purol
*Attorney, Agent, or Firm*—Diller, Ramik & Wight, P.C.

[57] ABSTRACT

A system for supporting a plurality of stacked glass sheets on edge includes a plurality of pressure-applying devices each including an elongated member to which is pivotally secured a pressure-applying member. The pressure-applying member can be moved along the elongated member to assure that tensioning forces are applied only to a central portion of a stack of glass sheets. In cases involving relatively high stacks of glass sheets the elongated member is preferably constructed as a pair of telescopically adjustable elongated members.

40 Claims, 4 Drawing Sheets

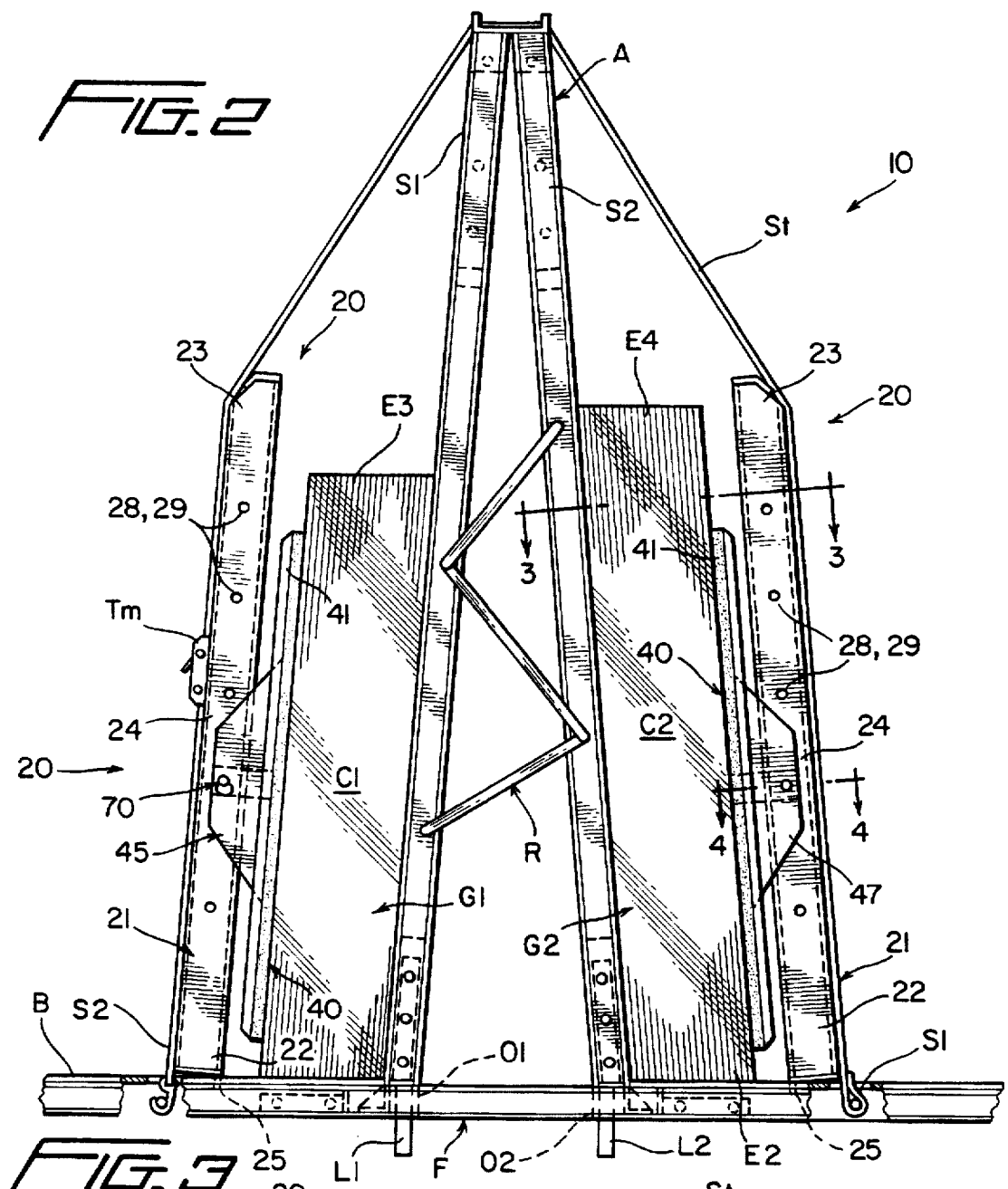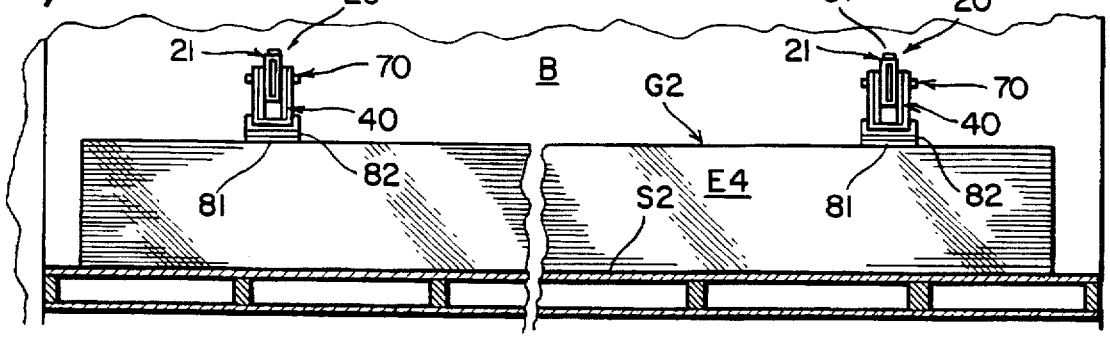

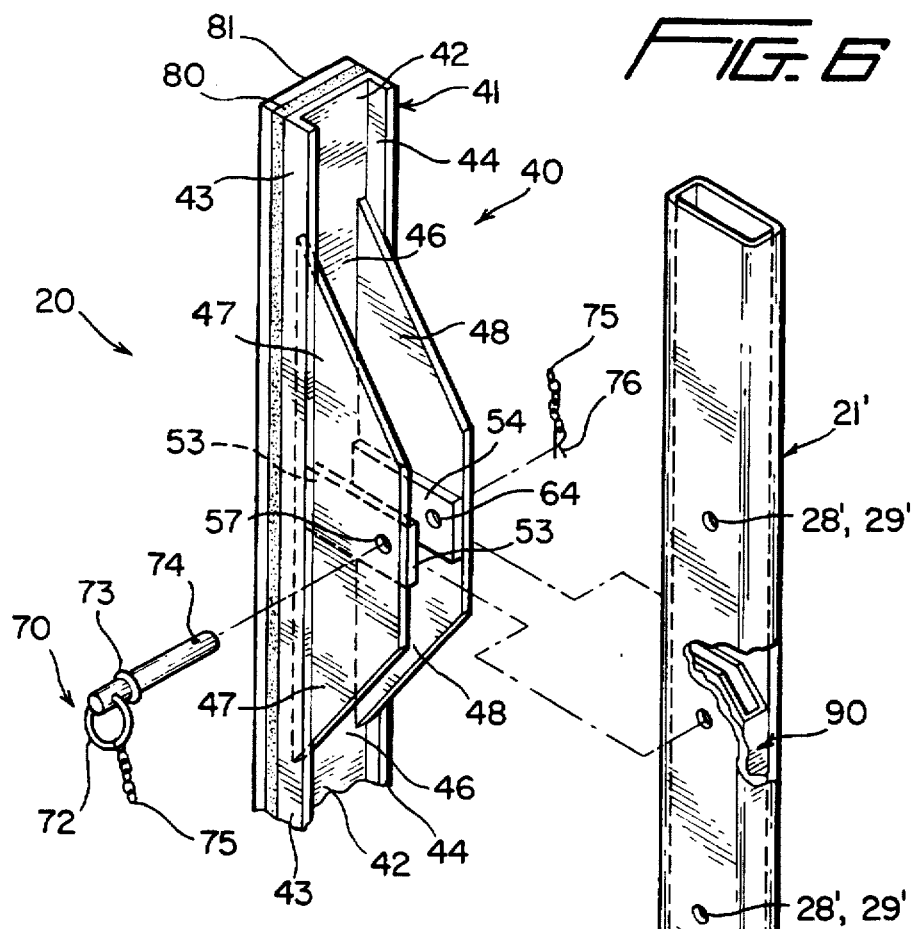
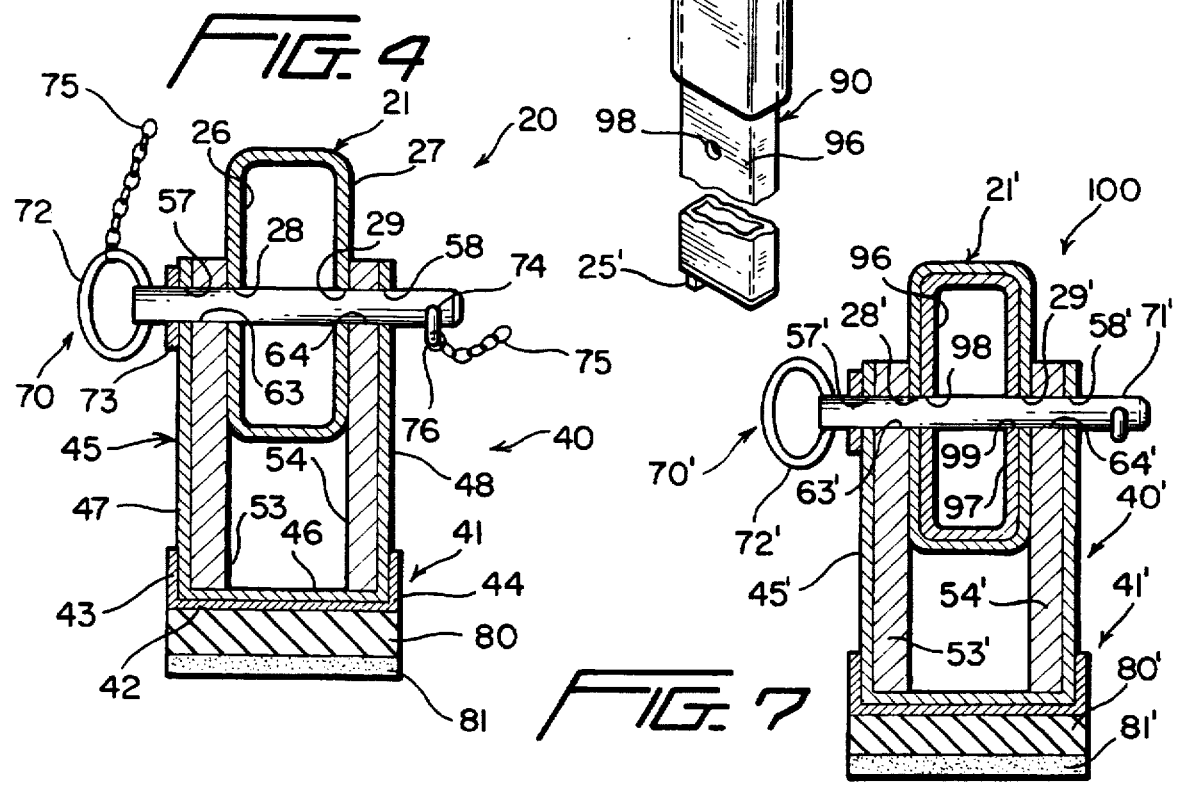

RETAINING DEVICE FOR TRANSPORTING STACKS OF ON-EDGE SUPPORTED SHEETS OF FLOAT GLASS

BACKGROUND OF THE INVENTION

In the flat glass industry, bulk products, such as sheets of float glass, are transported on-edge upon the bed of a vehicle, such as a truck, resting against an A-frame and secured thereto with straps. Conventional strapping methods apply the pressure against top edges of the stacked glass sheets causing compression and buckling of the glass which results in breakage, particularly when a load is subject to the normal vibration and/or shocks of transportation, as when the on-edge stacks of glass are being transported upon the bed of a truck or similar vehicle.

Typical of one such conventional strapping system is disclosed in U.S. Pat. No. 3,955,676 to Ralph C. Hansen et al. in which groups of flat sheets of frangible material, such as glass, are bound together to form stacks which rest against opposite sides of a conventional A-frame. Vertically disposed banding straps are connected at their lower ends to anchors in the truck bed and at their upper ends are connected to an apex upper portion of the A-frame. These straps or bands are tensioned and bear against upper edges of the stacks of glass which result in the aforementioned compressive forces resulting in breakage, particularly as the stacked glass is subject to typical transportation forces.

This same Hansen et al. patent and its parent (U.S. Pat. No. 3,878,942) also disclose the utilization of a plurality of tie-down devices which each include a substantially vertically elongated brace member carrying cushioning material which lies against the outer glass sheet of a group of on-edge stacked glass sheets. Upper ends of the brace members project beyond upper edges of the stacked glass sheets and are secured by adjustable telescopic members to the apex upper portion of the A-frame. The lower edges of the glass sheets are, however, clamped under the tension of one or more tensioning belts or straps which in turn create undesired compression loading of the glass at the lower edges with attendant breakage.

Each of the Hansen et al. patents also disclose a glass supporting system in which a plurality of tie-down devices project vertically beyond upper and lower edges of a stack of glass sheets and are each spanned by a tie-down strap. The tie-down straps do not themselves bear against the upper or lower edges of the stack of glass sheets, but compressive forces are brought to bear against the glass sheets upper edges by the tension straps due to the deflection of the tie-down devices which deflection is mitigated through the use of a plurality of spaced blocks positioned between a cushioned plate member and each tie down device.

A variety of other systems for protecting stacked glass sheets during storage and/or shipment are disclosed in U.S. Pat. No. 2,305,405 issued on Dec. 15, 1942 to Charles D. Burrell; U.S. Pat. No. 4,014,435 issued on Mar. 29, 1977 to James R. Rowley et al.; U.S. Pat. No. 2,156,876 issued on May 2, 1939 to R. D. Russell Scull; and U.S. Pat. No. 3,964,908 issued on Jun. 22, 1976 to James R. Rowley.

SUMMARY OF THE INVENTION

The retaining device or supporting system of the present invention includes in its most basic format a pressure-applying mechanism defined by an elongated member having opposite ends and a medial portion to which is pivotally attached a pressure-applying member. Several of such pressure-applying mechanisms or units are associated with each edge-supported stack of glass sheets with the pressure-applying member thereof positioned generally centrally of the stack of sheets and with the upper ends of the elongated members projecting well above upper edges of the stack of sheets. An anchoring or tensioning strap is appropriately connected and tensioned to apply uniform compressive forces to the central portion of the stacked glass sheets absent the application of localized forces, particularly at upper edges of the stack of glass sheets. Such centrally applied uniform forces intimately hold stacks of glass sheets against a conventional A-frame during vehicle transport and thus avoids the breakage heretofore noted associated with conventional systems.

The elongated member preferably includes a plurality of openings spaced along its length so that the pressure-applying member can be shifted and fixed in any desired position to accommodate each pressure-applying unit with respect to the particular height of on-edge stacked glass with which it is associated. Such adjustment allows the pressure-applying member to be positioned centrally of each edge-supported stack of glass irrespective of the height thereof, at least up to a predetermined height, after which another elongated member is associated with the first elongated member as a telescopic pair which can be selectively varied in length. Preferably, the pair of elongated members are retained in any position of relative adjustment through the utilization of a pin passing through registered openings in the pair of elongated members. The same pin is also preferably utilized to articulately/pivotally connect the pressure-applying member to the telescopically adjusted and united pair of elongated members.

The pair of elongated members of the pressure-applying unit or mechanism are preferably of a hollow polygonal transverse cross-sectional configuration with one elongated member being intimately slidably received in the other which prevents canting or cocking therebetween when subject to the loading of an associated tensioning, banding or hold-down strap or belt. The pressure-applying member is also preferably constructed of a transverse U-shaped cross-sectional configuration defined by a bight and a pair of legs with the pair of legs having aligned apertures which also receive the same pin fixing the relative telescopic position of the pair of elongated members. In this fashion the same pin both fixes the relative telescopic position of the pair of elongated members and the position of the pressure-applying member pivoted thereto.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 2 is an enlarged end view of two of the pressure-applying devices of the system associated with the conventional A-frame, and illustrates the location of each pressure-applying member thereof with respect to glass sheet stacks of different heights.

FIG. 3 is a fragmentary cross-sectional view taken generally along line 3—3 of FIG. 2, and illustrates the manner in which two of the pressure-applying devices are positioned with respect to the stack of glass and the A-frame.

FIG. 4 is an enlarged cross-sectional view taken generally along line 4—4 of FIG. 2, and illustrates details of the elongated member, the pressure applying member and a pivot pin connecting the same together.

FIG. 6, which appears on the sheet of drawings containing FIG. 5, is a fragmentary exploded view of one of the pressure-applying devices of FIG. 5, and illustrates the manner in which the pair of telescopic elongated members and the pressure-applying member are interconnected by the associated pivot pin passing through aligned apertures.

FIG. 7 is an enlarged cross-sectional view taken generally along line 7—7 of FIG. 5, and illustrates the assembled relationship of the pair of telescopic elongated members and the pressure applying member of the pressure-applying device.

DESCRIPTION OF THE PREFERRED EMBODIMENT

Figure 1:
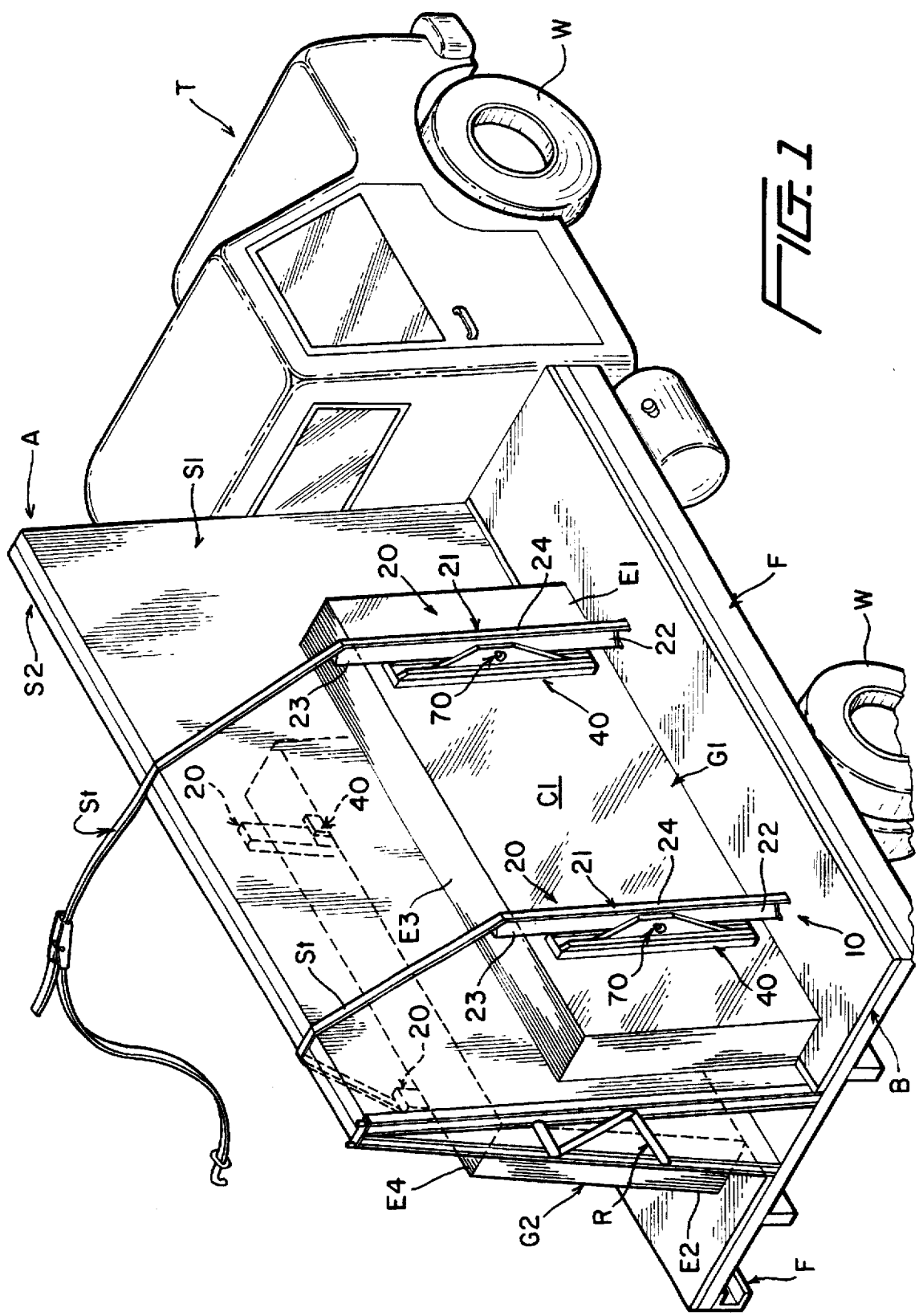
FIG. 1 is a perspective view of a novel float glass retaining or supporting system of the present invention associated with an A-frame carried by the bed of a conventional vehicle, and illustrates a plurality of identical pressure-applying devices or units bearing against stacks of on-edge supported float glass sheets with each pressure-applying device including a pressure-applying member pivotally attached to an elongated member having an upper edge projecting beyond upper edges of the stacked glass and tensioning straps associated therewith.

A novel float glass retaining system or a system for supporting a plurality of stacked plate-like sheets of frangible material, such as float glass sheets, on edge is illustrated in FIGS. 1 and 2 of the drawings and is generally designated by the reference numeral 10.

The glass stack retaining and/or supporting system 10 is illustrated in FIG. 1 of the drawings associated with a conventional wheeled vehicle, such as a flat bed truck which is generally designated by the reference character T. The truck T includes conventional wheels W, a frame F upon which rests a bed B and centrally longitudinally of the latter is a conventional A-frame A (FIGS. 1 and 2) defined by opposite generally planar sides S1, S2 each carrying a plurality of respective feet or legs L1, L2 (FIG. 2) which are received in respective openings O1, O2 of the bed B. End reinforcing braces R are located at axial opposite ends of the A-frame A and serve to rigidify the A-frame A in a conventional manner.

Stacks or blocks G1, G2 of relatively large sheets of float glass are edge-supported upon respective lower edges E1, E2 resting upon the bed B of the truck T. Each stack or block G1, G2 of glass includes respective upper edges E3, E4 and central portions C1, C2. As is best illustrated in FIG. 2, the stack G1 is shorter than the stack G2 with the heights being respectively 60" and 75". The lengths thereof, as viewed in FIG. 1, are approximately the same, though both the height and lengths of the blocks or stacks of glass G1, G2 which can be transported in accordance with the invention can be varied considerably.

The supporting or retaining system 10 includes a plurality of identical pressure-applying devices, units or mechanism which are each identically identified by the reference numeral 20.

Each pressure-applying device 20 includes a generally elongated hollow metallic member 21 of a generally polygonal or rectangular transverse cross-section, as is best illustrated in FIG. 4. Each elongated member 21 is constructed from relatively rigid metal, such as extruded aluminum, but other materials may be utilized in lieu thereof. Each elongated member 21 includes a lower end portion 22, an upper end portion 23 and a medial or central portion 24 therebetween. Each lower end portion 22 includes a relatively short downwardly directed leg 25 (FIG. 2) which can be inserted into one of a plurality of openings (unnumbered) formed in the bed B of the truck T to accurately locate each pressure-applying device 20 relative to its associated glass sheet stack G1 or G2 depending, of course, upon the thickness thereof. Opposite wall portions 26, 27 (FIG. 4) of each elongated member 21 is provided with aligned openings 28, 29, respectively. A series of such openings 28, 29 are provided along, the length of each elongated member 21, as is best illustrated in FIG. 2, with the spacing between each pairs of the aligned openings or apertures 28, 29 being approximately one foot.

Each pressure-applying device 20 further includes an associated pressure-applying member 40 which is also relatively elongated and includes a first relatively shallow U-shaped channel member 41 defined by a bight portion 42 and opposite parallel arms 43, 44 and a second channel member 45 also of a generally U-shaped configuration, as viewed in transverse section, which is defined by a bight portion 46 and arms 47, 48. The channel member 45 is seated within the channel member 41 and the respective arms 47, 48 and 43, 44 are welded to each other. The arms 47, 48 are generally of a trapezoidal configuration, as is best illustrated in FIG. 6, and against each is welded a reinforcing plate 53, 54, respectively, of a generally rectangular configuration (FIG. 6). Each of the arms 47, 48 includes apertures or openings 57, 58 which are in axial alignment with each other and with respective apertures or openings 63, 64 in the plates 53, 54, respectively. The openings or apertures 57, 58; 63, 64 and 28, 29 function in conjunction with pivot means 70 in the form of a pivot pin 71 passing therethrough to define means for articulately or pivotally connecting or uniting each elongated member 21 to each pressure-applying member 40. Each pivot pin 71 includes a retention ring 72, an integral collar 73, an axial opening 74 and a cable 75 connecting the retention ring 72 to a conventional cotter pin 76, one leg (unnumbered) which can be inserted into the opening 74 of the pivot pin 71 to preclude disassembly of the pivot pin 71 from the openings 28, 29; 57, 58; and 63, 64, as is evident from FIG. 4 of the drawings.

A layer 80 of rubber material and/or an additional layer 81 of softer rubber material laminated thereto is laminated to the bight 42 of the channel 41 of the pressure-applying member 41 and runs the length thereof. The layer 81 of the each of the pressure-applying devices 20 rests against the centermost portion C1, C2 of the respective stacks G1, G2 of glass sheets with upper ends (unnumbered) of each pressure-applying member 40 being positioned well below the uppermost edges E3, E4 of the respective stacks G1, G2. The upper ends 23 of the elongated member 21 of each pressure-applying device 20 projects well above the associated upper edges E3, E4 of the glass stacks G1, G2, respectively.

A conventional tensioning strap or hold-down strap $S_r$ includes a first end S1 conventionally connected in the manner illustrated in FIG. 2 to the bed B while a second end $S_2$ is similarly conventionally connected to the bed B. The second end $S_2$ of the strap $S_r$ can actually be a separate strap, but irrespective of the particular construction thereof, a conventional toggle mechanism Tm applies tensioning forces to the strap S, and directly against each of the elongated members 20 of each of the pressure-applying devices 20 in the manner clearly illustrated at FIGS. 1 and 2 of the drawings. The pressure or force thus applied to the elongated members 21 of the pressure-applying devices 20 is transferred through the pivot pins 71 to the pressure-applying members 40 and through the layers of resilient material 80 and/or 81 thereof centrally to the medial or central portions C1, C2 of the groups or stacks G1, G2 of glass edge-stacked upon the bed B of the truck T. The upper edges E3, E4 of the glass stacks G1, G2 project well above each of the pressure-applying members 40 and the lower edges E1, E2 project well below the lowermost edges of the pressure-applying members 40. Thus, the forces of the pressure-applying members 40 are applied essentially centrally of and below the upper edges E3, E4 and above the lower edges E1, E2, thus uniformly urging the respective glass stacks G1, G2 against the respective supports S1, S2 of the A-frame A in a uniform manner in the absence of any direct application of such forces to any of the edges E1–E4. Thus, travel of the truck T and attendant vibratory forces do not adversely effect the glass sheets of the stacks G1, G2 and breakage is essentially precluded or materially reduced.

In the embodiment of the invention illustrated in FIG. 2, the 60" and 72" heights of the respective stacks G1, G2 can be efficiently and effectively retained utilizing a single length one-piece elongated member 21 associated with each of the pressure-applying devices 20. However, sheet glass can be manufactured in sizes beyond the 60" and 72" heights depicted in FIG. 2, and examples of the latter are reflected in FIG. 5 to which like reference numerals have been applied to indicate identical structure to that described with respect to FIGS. 1 through 4 of the drawings.

Figure 5:
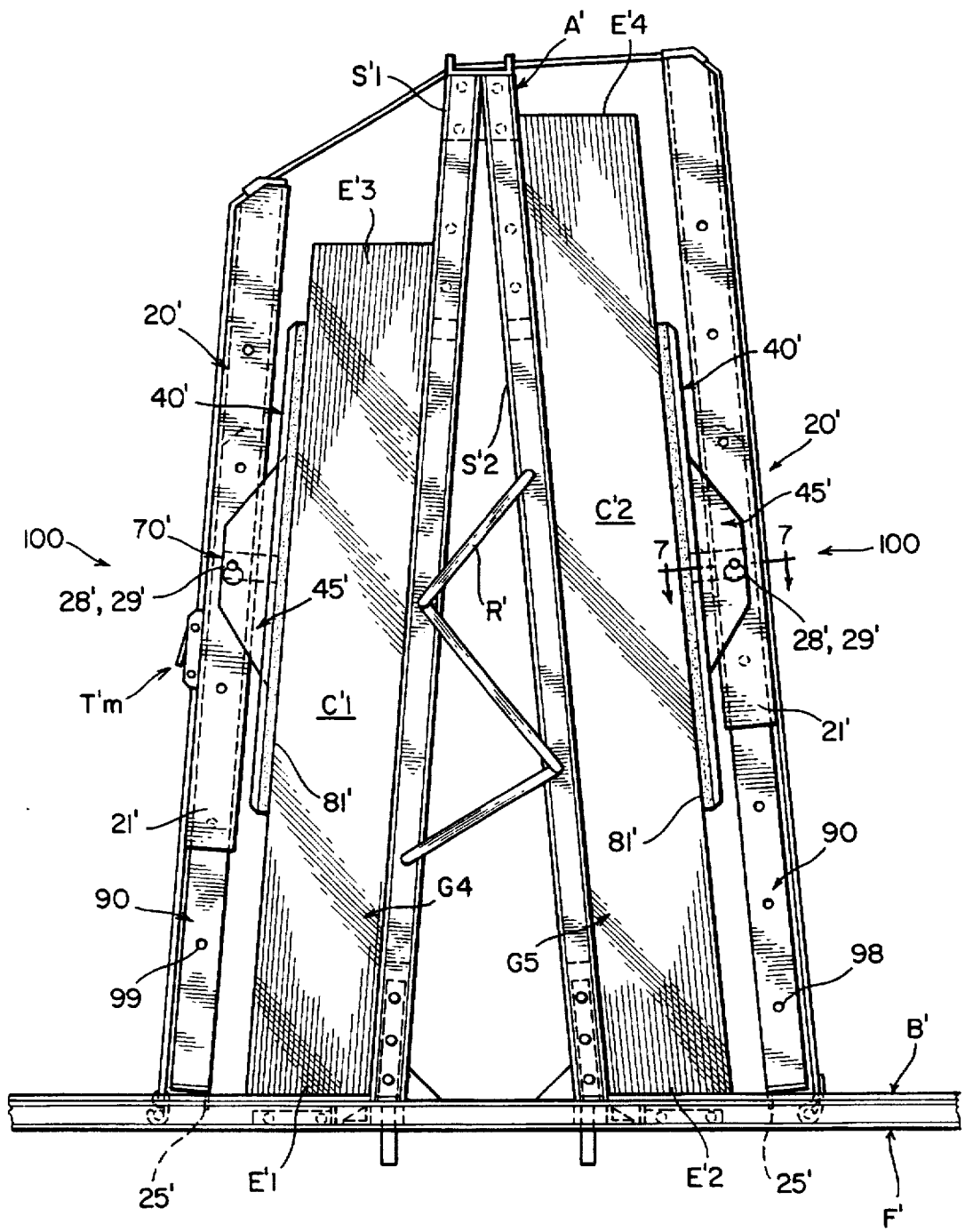
FIG. 5 is an end view similar to FIG. 2, and illustrates another embodiment of the invention in which each pressure-applying device, unit or mechanism is defined by a pair of telescopically associated elongated members selectively adjusted telescopically relative to each other to achieve the application of forces through an associated pressure-applying member to a central portion of an associated on-edge stack of glass sheets of different heights.

In FIGS. 5 through 7 of the drawings, several identical pressure-applying devices, units or mechanism 100 are illustrated in conjunction with an identical vehicle bed B' which supports stacks G4 and G5 of float sheet glass having respective heights of 84" and 9". The lengths (not shown) of the glass stacks G4, G5 can be the same or different, but insofar as the present embodiment of the invention is concerned, it is the heights of the stacks G4, G5 that are significant. In each case, the pressure applied by each pressure-applying member 40' is again necessarily located centrally of the associated glass stack G4, G5, again leaving upper edges $E_3'$, $E_4'$ and lower edges E1', $E_2'$ relatively unconstrained. In order to apply hold-down forces or retention forces against central portions C1' and C2' of the respective stacks G4, G5, each pressure-applying mechanism 100 is of a telescopic construction which utilizes as an upper portion thereof the entirety of the pressure-applying device 20 of FIGS. 1–A which in FIG. 5 is identified by the reference numeral 20' except the feet 25 of the elongated members 21 are eliminated. Additionally, a base elongated member 90 constructed as a hollow tube of metallic material, such as extruded aluminum or similar metal, is telescopically received internally of each elongated member 21'. Walls 96, 97 (FIG. 7) of each base elongated member 90 includes respective openings or apertures 98, 99 which can be aligned with selective apertures 28', 29' of the elongated member 21' to lengthen or shorten the overall total length of the entire force-applying device 100, as is readily apparent from comparing the two identically constructed pressure-applying members 100 in FIG. 5 which differ only in the degree of relative telescopic assembly thereof. In other words, the base elongated member 90 is telescopically inserted further into the left-hand illustrated pressure-applying device 100 of FIG. 5 then is the base elongated member 90 of the right-hand illustrated pressure-applying device 100. The leg 25 of each pressure-applying device 20 is, of course, utilized in conjunction with each base elongated member 90, as is reflected by the reference numeral 25' in FIGS. 5 and 6 of the drawings, to facilitate the connection of each base elongated member 90 to the truck bed B'. However, once the associated toggle mechanism $T_m'$ of FIG. 5 is appropriately tightened, the force or pressure of the pressure-applying members 40' are concentrated against the central portions $C_1'$ and $C_2'$ of the respective glass stacks G4 and G5, again leaving unrestrained the edges E1' through E4'.

Although a preferred embodiment of the invention has been specifically illustrated and described herein, it is to be understood that minor variations may be made in the apparatus without departing from the spirit and scope of the invention, as defined the appended claims.

What is claimed is:

1. A system for supporting a plurality of stacked plate-like sheets on edge comprising a plurality of stacked plate-like sheets each having upper and lower edges, means for defining a substantially horizontal supporting surface upon which the plate-like sheets are edge-supported, means for defining a substantially upright supporting surface against which the stacked plate-like sheets rest, a generally elongated member disposed in substantially upright relationship to said horizontal supporting surface and in substantially spaced relationship to an outboard plate-like sheet of said stacked plate-like sheets, a pressure-applying member sandwiched between the outboard plate-like sheet and the substantially upright elongated member, means for articulately uniting the pressure-applying member to the substantially upright elongated member, said pressure-applying member having respective upper and lower edge portions disposed respectively below and above the upper and lower edges of said stacked plate-like sheets, strap means extending substantially from said horizontal supporting surface means along said upright elongated member and in spaced relationship across said stacked plate-like sheets upper edges to said substantially upright supporting surface for holding said stacked plate-like sheets against said upright supporting surface through said pressure-applying member, and means for tensioning said strap means whereby forces are applied by said pressure-applying member to substantially only a medial zone of the stacked plate-like sheets in the absence of forces being directly applied to the stacked plate-like sheets upper and lower edges.

2. The supporting system as defined in claim 1 wherein said substantially upright elongated member is defined by at least a pair of elongated members which are adapted for relative movement to selectively vary the overall length of said elongated member.

3. The supporting system as defined in claim 1 wherein said substantially upright elongated member is defined by at least a pair of elongated members which are adapted for relative movement to selectively vary the overall length of said elongated member, and means for securing said pair of elongated members together at each of a plurality of different relative locations to establish different effective lengths of said substantially upright elongated member.

4. The supporting system as defined in claim 1 wherein said substantially upright elongated member is defined by at least a pair of telescopic elongated members which are adapted for relative movement to selectively vary the overall length of said elongated member.

5. The supporting system as defined in claim 1 wherein said substantially upright elongated member is defined by at least a pair of telescopic tubular elongated members which are adapted for relative movement to selectively vary the overall length of said elongated member.

6. The supporting system as defined in claim 1 wherein said articulate uniting means is a pivot.

7. The supporting system as defined in claim 2 wherein said articulate uniting means are constructed and arranged for securing said pair of elongated members together at each of a plurality of different relative locations to establish different effective lengths of said substantially upright elongated member.

8. The supporting system as defined in claim 1 wherein said substantially upright elongated member is substantially tubular.

9. The supporting system as defined in claim 1 wherein said pressure-applying member is of a substantially U-shaped transverse cross-sectional configuration.

10. The supporting system as defined in claim 1 wherein said substantially upright elongated member is substantially tubular, and said pressure-applying member is of a substantially U-shaped transverse cross-sectional configuration.

11. The supporting system as defined in claim 1 wherein said substantially upright elongated member is defined by at least a pair of tubular telescopic members, aperture means in said pair of tubular telescopic members, and said articulate uniting means includes a pivot pin which can be selectively positioned in said aperture means to both vary the length of said upright elongated member and articulately unit said pressure-applying member thereto.

12. The supporting system as defined in claim 11 wherein said pressure-applying member is of a generally U-shaped transverse cross-sectional configuration.

13. The supporting system as defined in claim 11 wherein said pressure-applying member is of a generally U-shaped transverse cross-sectional configuration defined by a bight and a pair of arms within which said pair of tubular telescopic members are at least partially housed.

14. The supporting system as defined in claim 11 wherein said pressure-applying member is of a generally U-shaped transverse cross-sectional configuration defined by a bight and a pair of arms within which said pair of tubular telescopic members are at least partially housed, and aperture means in said legs which are alignable with aperture means of said pair of tubular telescopic members.

15. A mechanism for applying pressure against a plurality of stacked plate-like sheets comprising a substantially elongated member having opposite ends and a medial portion therebetween, a pressure-applying member adapted to applying pressure against a plurality of on-edge stacked plate-like sheets, and means for articulately uniting the medial portion of said substantially elongated member to a medial portion of said pressure-applying member.

16. The pressure-applying mechanism as defined in claim 15 wherein said articulate uniting means is a pivot.

17. The pressure-applying mechanism as defined in claim 15 wherein said elongated member is a substantially hollow tube.

18. The pressure-applying mechanism as defined in claim 15 wherein said elongated member is a substantially hollow tube of a substantially polygonal transverse cross-sectional configuration.

19. The pressure-applying mechanism as defined in claim 15 wherein said elongated member is a substantially hollow tube of a substantially rectangular transverse cross-sectional configuration.

20. The pressure-applying mechanism as defined in claim 15 wherein said pressure-applying member is of a substantially U-shaped transverse cross-sectional configuration.

21. The pressure-applying mechanism as defined in claim 15 wherein said elongated member is defined by at least a pair of elongated members which are adapted for relative movement to selectively vary the overall length of said elongated member.

22. The pressure-applying mechanism as defined in claim 15 wherein said elongated member is defined by at least a pair of elongated members which are adapted for relative movement to selectively vary the overall length of said elongated member, and means for securing said pair of elongated members together at each of a plurality of locations to fix the overall length of said elongated member.

23. The pressure-applying mechanism as defined in claim 21 wherein said elongated member is defined by at least a pair of elongated members which are adapted for relative movement to selectively vary the overall length of said elongated member.

24. The pressure-applying mechanism as defined in claim 21 wherein said pair of elongated members are constructed and arranged for relative sliding movement.

25. The pressure-applying mechanism as defined in claim 21 wherein said pair of elongated members are constructed and arranged for relative telescopic sliding movement.

26. The pressure-applying mechanism as defined in claim 21 wherein said securing means in part defines said articulate uniting means.

27. The pressure-applying mechanism as defined in claim 26 wherein said articulate uniting means includes a pivot pin registered in aligned openings of said pair of elongated members.

28. The pressure-applying mechanism as defined in claim 27 wherein said pair of elongated members are constructed and arranged for relative telescopic sliding movement.

29. The pressure-applying mechanism as defined in claim 28 wherein each of said pair of elongated members is of a hollow construction and said pressure-applying member is of a substantially U-shaped transverse cross-sectional configuration.

30. The pressure-applying mechanism as defined in claim 28 wherein each of said pair of elongated members is of a hollow construction and said pressure-applying member is of a substantially U-shaped transverse cross-sectional configuration defined by a bight and a pair of arms, and said pivot pin is registered in an opening in each of said arms.

31. A mechanism for applying pressure against a plurality of stacked plate-like sheets comprising a substantially elongated member having opposite ends and a medial portion therebetween, a pressure-applying member adapted to applying pressure against a plurality of on-edge stacked plate-like sheets, and means for articulately uniting a medial portion of said pressure-applying member to one of a plurality of spaced points along the medial portion of said substantially elongated member.

32. The pressure applying mechanism as defined in claim 31 wherein said articulate uniting means is a pivot.

33. The pressure-applying mechanism as defined in claim 31 wherein said elongated member is a substantially hollow tube.

34. The pressure-applying mechanism as defined in claim 31 wherein said elongated member is a substantially hollow tube of a substantially polygonal transverse cross-sectional configuration.

35. The pressure-applying mechanism as defined in claim 31 wherein said elongated member is a substantially hollow tube of a substantially rectangular transverse cross-sectional configuration.

36. The pressure-applying mechanism as defined in claim 31 wherein said pressure-applying member is of a substantially U-shaped transverse cross-sectional configuration.

37. The pressure-applying mechanism as defined in claim 31 wherein said articulate uniting means includes a plurality of openings spaced from each other along the length of said substantially elongated member.

38. The pressure-applying mechanism as defined in claim 31 wherein said articulate uniting means includes a plurality of openings spaced from each other along the length of said substantially elongated member, and a pivot pin connecting said medial portions together through registration with selected ones of said openings.

39. The pressure-applying mechanism as defined in claim 38 wherein said elongated member is a substantially hollow tube of a substantially rectangular transverse cross-sectional configuration.

40. The pressure-applying mechanism as defined in claim 39 wherein said pressure-applying member is of a substantially U-shaped transverse cross-sectional configuration.

* * * * *